United States Patent [19]
Heuke

[11] Patent Number: 5,535,538
[45] Date of Patent: Jul. 16, 1996

[54] AUTOMATIC JIGGING DEVICE FOR FISHING

[76] Inventor: Thomas E. Heuke, 619 Garfield, Lincoln, Nebr. 68502

[21] Appl. No.: 341,511

[22] Filed: Nov. 17, 1994

[51] Int. Cl.$^6$ ............................................. A01K 97/10
[52] U.S. Cl. ............................................. 43/19.2; 43/26.1
[58] Field of Search ................................. 43/19.2, 26.1

[56] References Cited

U.S. PATENT DOCUMENTS

| | | | |
|---|---|---|---|
| 2,643,478 | 6/1953 | Paulsen | 43/19.2 |
| 2,707,843 | 5/1955 | Howe | 43/26.1 |
| 2,746,198 | 5/1956 | Smith | 43/19.2 |
| 3,001,317 | 9/1961 | Boughton | 43/19.2 |
| 3,549,920 | 12/1970 | Tavel | 310/68 |
| 3,550,302 | 12/1970 | Creviston | 43/19.2 |
| 3,568,352 | 3/1971 | Hill | 43/19.2 |
| 3,599,369 | 8/1971 | Carlson | 43/19.2 |
| 3,789,534 | 2/1974 | Yankaitis | 43/19.2 |
| 3,835,570 | 9/1974 | Philip | 43/19.2 |
| 4,020,582 | 5/1977 | Thelen | 43/19.2 |
| 4,077,149 | 3/1978 | Enquist | 43/19.2 |
| 4,081,922 | 4/1978 | Johnson | 43/19.2 |
| 4,084,342 | 4/1978 | Philip | 43/19.2 |
| 4,373,287 | 2/1983 | Grahl | 43/19.2 |
| 4,420,900 | 12/1983 | Nestor | 43/19.2 |
| 4,680,885 | 7/1987 | Lindell | 43/19.2 |
| 4,700,501 | 10/1987 | Bryan | 43/19.2 |
| 4,916,847 | 1/1990 | Rusgo | 43/19.2 |
| 4,951,411 | 8/1990 | Ecker | 43/19.2 |
| 5,036,616 | 9/1991 | Wilsey | 43/19.2 |
| 5,084,995 | 2/1992 | Beaudoin | 43/19.2 |
| 5,208,987 | 5/1993 | Christen | 33/18.1 |
| 5,231,784 | 8/1993 | Condusta | 43/19.2 |

OTHER PUBLICATIONS

Lunde, Anders S., *Whirligigs Design and Construction*, Chilton Book Co., 1986, pp. 2,3, The Original Whirligig.

*Primary Examiner*—Kurt Rowan

[57] ABSTRACT

A mechanical jigging device utilizing a battery operated motor (42) with a shaft eccentric fly weight (46) to produce vibrations. The motor (42) is adjustably attached to differing forms of interchangeable cantilever spring arms (30) that are adjustably attached to a base (20). Vibrations travel to the free end of the cantilever spring arm (30) where they are transferred down a monofilament fishing line (56) from a fishing rod (52) and reel into the water to an attached lure )100 ) or bait to cause multidimensional movement. The resulting life-like movement of the lure (100 ) causes predator fish to be attracted by sight and sound and ultimately to strike the lure (100). A wind driven pin wheel fan (62) with a mounted eccentric weight (78) on it's shaft (64) can be substituted as the source of vibrational motion rather that the battery operated motor (42).

16 Claims, 8 Drawing Sheets

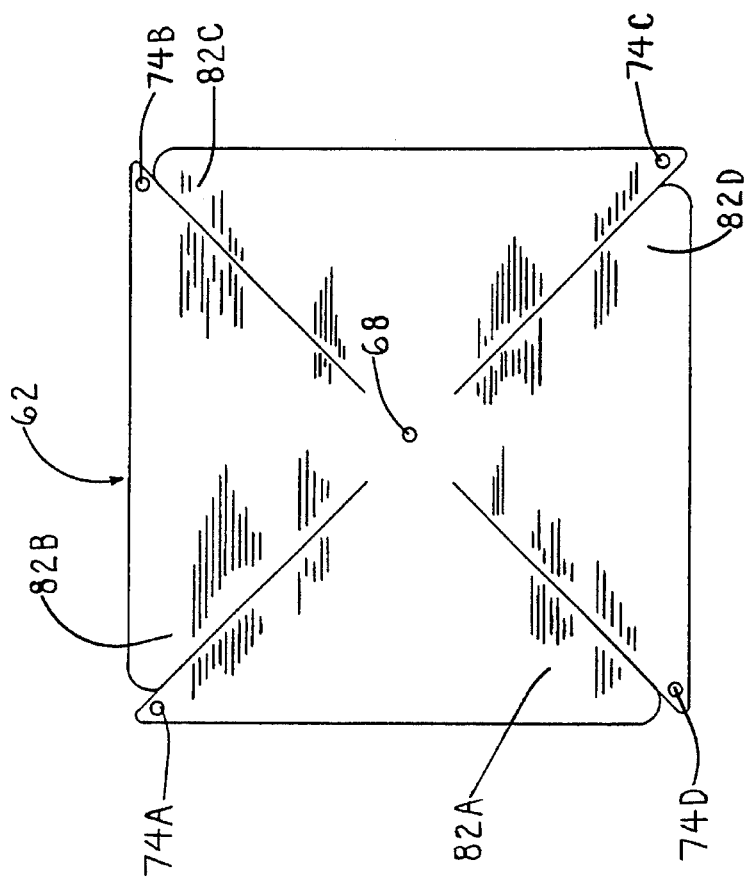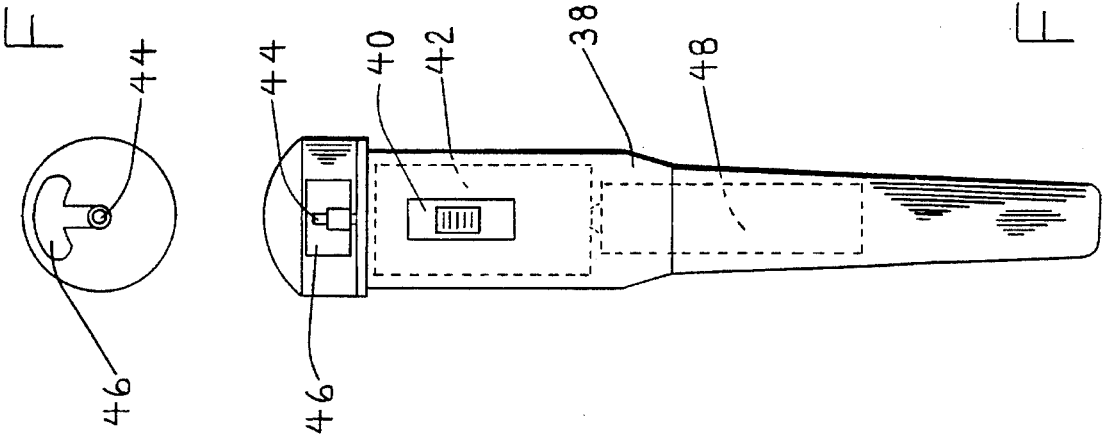

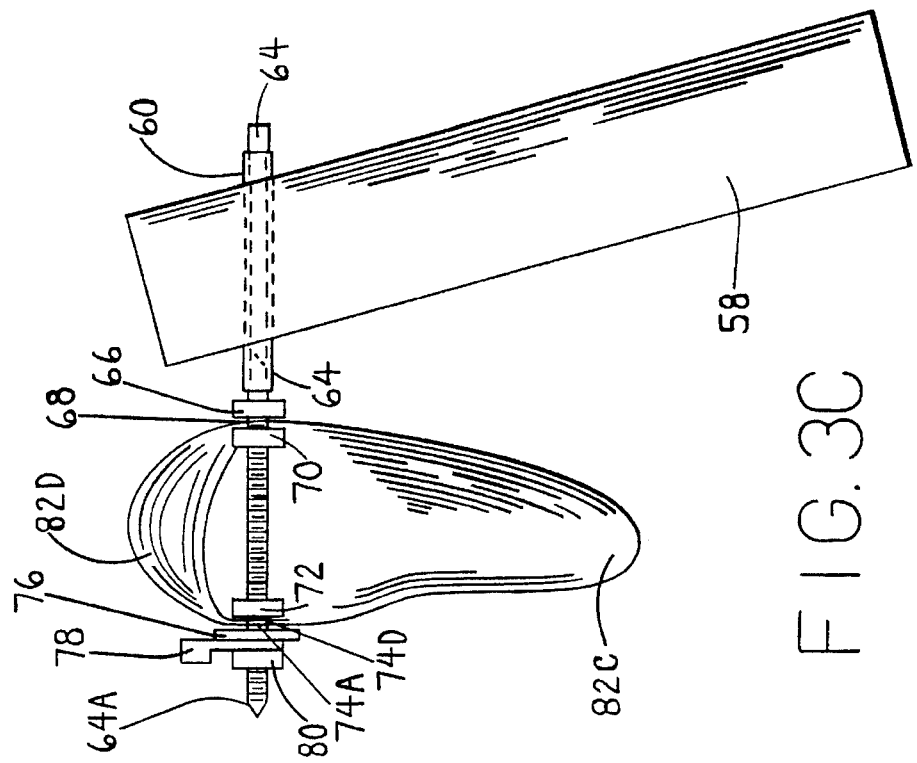
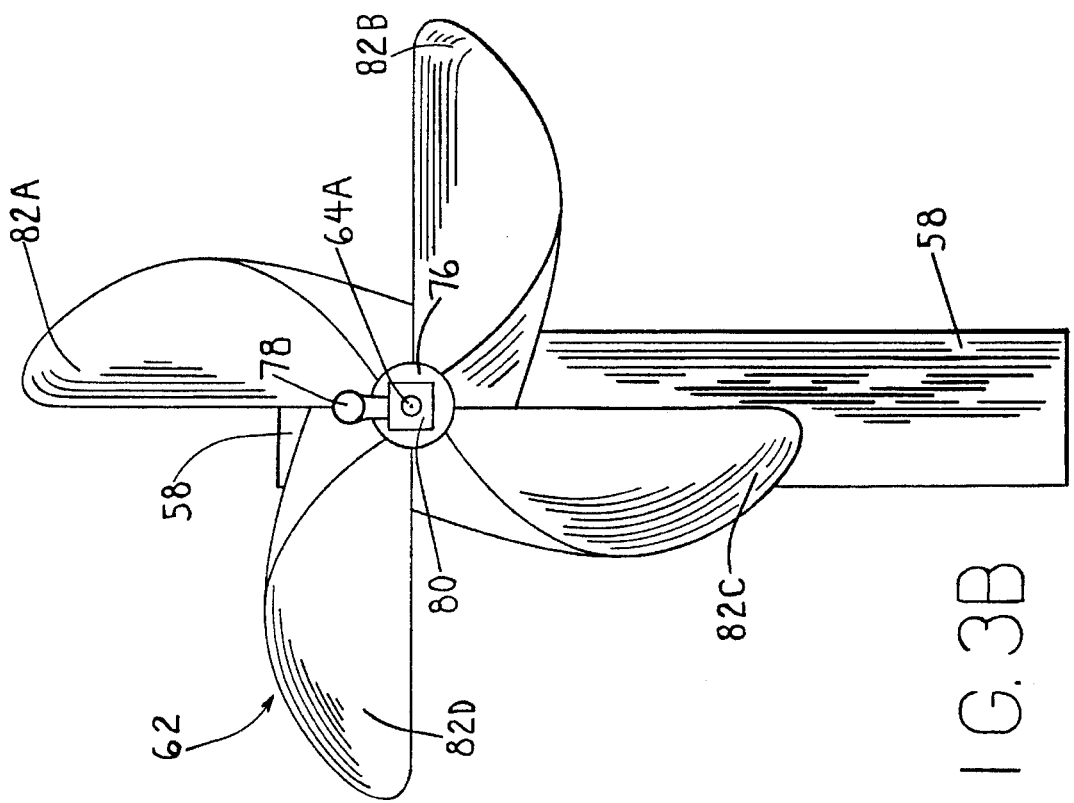

AUTOMATIC JIGGING DEVICE FOR FISHING

BACKGROUND

1. Field of Invention

This invention relates to fishing, specifically to the method of fishing called jigging, and more specifically to mechanized jigging.

2. Description of Prior Art

Jigging is the practice of moving a lure or bait up and down in the water for periods of time at different depths to locate, attract, and capture fish. This particular method of fishing is popular during ice fishing. The angler stands directly above a hole in the ice and moves the bait up and down. This method of fishing may also be applied when fishing from an anchored boat or from a dock.

Jigging can be accomplished manually, however, in the past, attempts to transfer this motion to motorized mechanical devices have been made. Numerous approaches and attempts are reflected in prior art. Heretofore, the attempts at mechanized jigging have been by the following four methods: 1) a rotational motor and linkage transfer of movement, 2) wind aided, 3) electromagnetic vibration, and 4) rotational motor with an eccentric element.

Prior art that use a rotational motor with linkage, transfer the rotational motion to up and down motion by the use of cams, gears, flywheels, cranks, levers, helical springs, or wire. They tend to be complicated in nature translating to increased manufacturing expense. They are complex and difficult to use for the average fisherman. They can also be heavy and difficult to transport long distances.

Prior art of this type include:

U.S. Pat. No. 3,789,534, Feb. 5, 1974, Thomas J. Yankaitis

U.S. Pat. No. 4,420,900, Dec. 20, 1983, John M. Nestor

U.S. Pat. No. 5,036,616, Aug. 6, 1991, Steven M. Wilsey

U.S. Pat. No. 5,084,995, Feb. 4, 1992, Arthur W. Beaudoin

The wind aided type of jigging motion are represented by ice fishing tip-ups. They can further be divided into those with a waving wand, a rotational fan, or a pivoting mechanism with a wind wand. The problem with relying on the wind entirely for motion is the wind is unreliable. Wind velocity constantly changes which makes tuning or adjusting of these devices a constant problem. Some are not sensitive enough to create constant motion. Rotational wind fans have been used since ancient times to convert wind energy to mechanical motion. In the use in fishing devices the rotational motion is changed to linear up and down motion by use of a crank on the shaft.

Prior art for wind aided devices include:

U.S. Patent No. 4,077,149, Mar. 7, 1978, Andrew N. Enquist(waving wind wand)

U.S. Pat. No. 3,599,569, Aug. 17, 1971, Authur P. Carlson (rotational wind fan)

U.S. Pat. No. 5,231,784, Aug. 3, 1993, James Condusta (rotational wind fan)

U.S. Pat. No. 4,373,287, Feb. 15, 1983, Paul F. Grahl (pivot and wind wand)

Those devices using electromagnetic vibration are usually attached to the fishing rod directly or on the handle of the rod. They vibrate the rod. They are sensitive to rod flexibility, and must be mounted on the rod on a particular point on the rod to create ideal vibration.

Prior art of electromagnetic vibrators include:

U.S. Pat. No. 2,746,198, May 22, 1956, John Smith

U.S. Pat. No. 3,001,317, Sep. 26, 1961, Nolan E. Boughton

U.S. Pat. No. 4,020,582, May 3, 1977, Rodney G. Thelen

Jigging devices using rotational motors with an eccentric element to produce a vibrating motor are of two types. Those that use a bent shaft extension from the motor, vibrate and also flick the fishing line as the bent shaft extension rotates to touch the line.

Prior art of this type include:

U.S. Pat. No. 3,835,570, Sep. 17, 1974, Charles R. Philip

U.S. Pat. No. 4,084,342, Apr. 18, 1978, Charles R. Philip

The other type of eccentric is the use of a weight on the rotating shaft end to cause vibration.

Prior art for this type is:

U.S. Pat. No. 4,700,501, Oct. 20, 1987, George Bryan

This vibrating jigging device also clamps on the rod, similar to the electromagnetic type of vibrators. When the attachment is to the rod, there is a loss of balance of the rod. Fishing rods are made with a delicate balance. Attaching the motor to the rod destroys the balance the rod manufacturer has worked hard to achieve. The motor needs to be placed at a narrow position on the rod to achieve maximum vibration at the rod tip. This means a narrow area of variability. Variability in presentation is necessary for different species of fish. This might require differing rapidity of motion and deflection of the fishing line. Clamping the motor to the rod presents another problem in that an expensive rod's finish could be marred.

Rods are generally flexible and are made to bend so that fish can be played and landed. Part of the fun of fishing is seeing the rod bend as the fish is played. The rods are not being used as they were designed when attachments are made on the rod. Attaching a rigid motor on the rods creates a loss of the flexibility or action of the rod and possible weakness to cause breaking of the rod at the point of attachment. Placing a motor on the rod also creates a potential for monofilament line tangling as line is withdrawn or reeled in. Some devices attach to the fishing line, making it necessary to release them prior to landing a fish.

Most of the prior art jigging devices effect an up and down movement or are one dimensional. The ultimate motion or life-like motion of a bait fish would be a multidimensional motion device that can cause motion in all directions.

The rotating motor with an eccentric weight attachment on the shaft to cause vibration have generally had other uses other than for fishing.

Typical prior art of this type of motor are reflected in the following two patents:

U.S. Pat. No. 8,549,920, Dec. 22, 1970, Jon H. Tavel

U.S. Pat. No. 5,208,987, May 11, 1993, Richard P. Christen.

OBJECTS AND ADVANTAGES

Objects and advantages of the present invention are:

(a) to provide a jigging device that is economical to manufacture;

(b) to provide a jigging device that is fun and easy to use for any age fisherman;

(c) to provide a jigging device that uses a battery operated motor or a wind aided fan when sufficient wind is present;

(d) to provide a jigging device that is separate from the fishing rod so that the rod can be used as designed; that allows the fisherman to play his fish with a well balanced flexible rod; that the rod will not be damaged or broken or misbalanced by having the device separate from the rod;

(e) to provide a jigging device that by being separate from the rod will allow for greater variability of the type desired; that as much or as little vibration as wanted can be tuned in for a particular species of fish;

(f) to provide a jigging device in which the fishing line can be removed from the device by simply lifting the line off the device;

(g) to provide a jigging device that will not allow tangling of the fishing line to be a problem;

(h) to provide a jigging device that goes beyond up and down movement to the multidimensional movement of the lure, which is needed to attract predator fish; that the movement will also cause vibrational movement to the surrounding water of the lure that predator fish sense beyond just visual contact of the lure;

(i) to provide a jigging device that can be disassembled and transported easily.

Further objects and advantages will become apparent from a consideration of the ensuing description and drawings.

BRIEF DESCRIPTION OF DRAWING FIGURES

FIG. 1 shows the present automatic jigging device equipped with battery operated motor in isometric view.

FIGS. 2A and 2B show a battery operated vibrating motor with eccentric in side and end views respectively, from prior art, U.S. Pat. No. 5,203,987, May 11, 1993, Christen.

FIGS. 3A, 3B, and 3C show a pin wheel fan. 3A—flat pattern of pin wheel fan. 3B—as pin wheel appears facing wind. 3C—side view of fan showing two vanes removed to show components.

Figure 1:
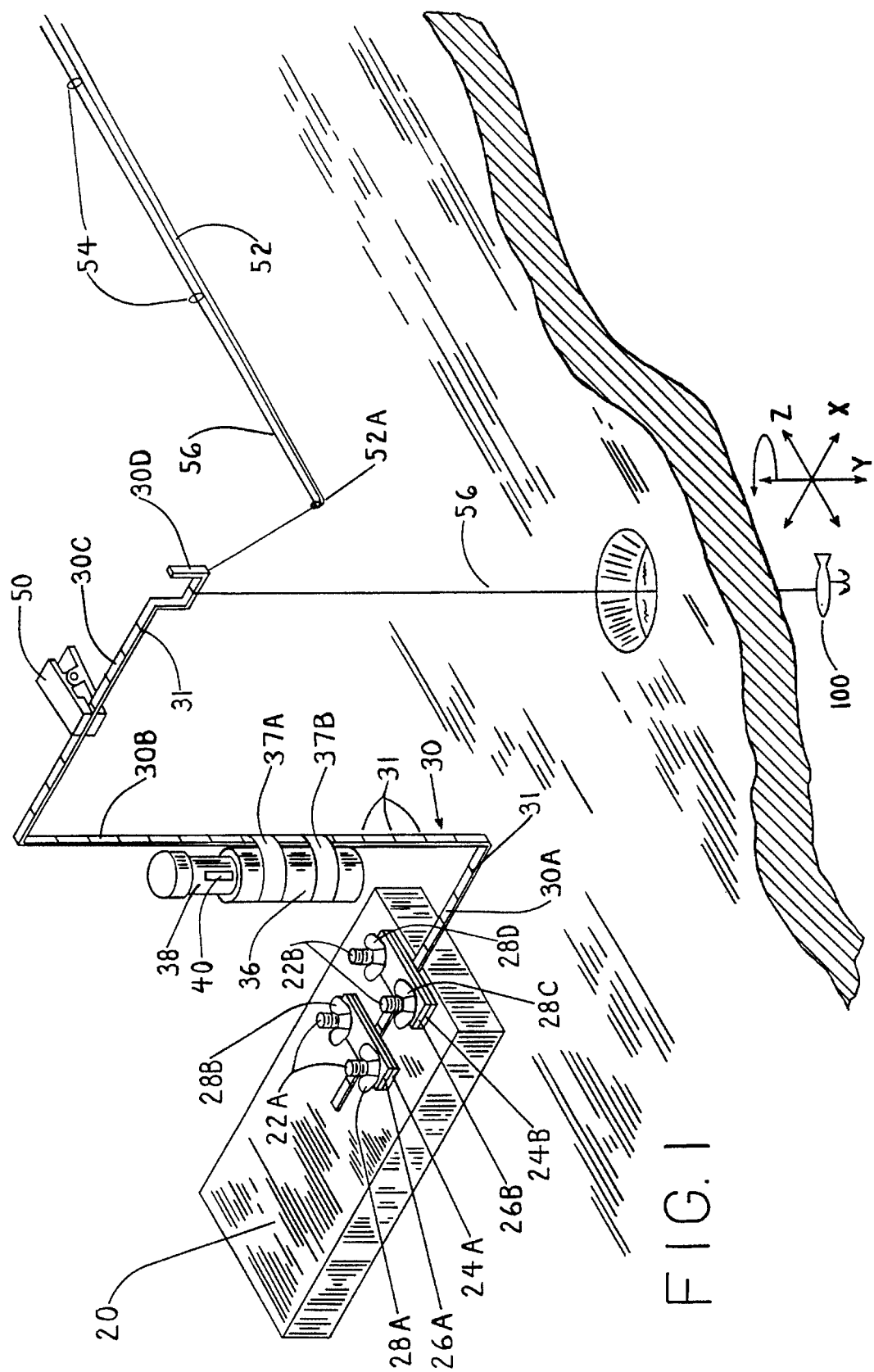

LIST OF REFERENCE NUMERALS IN DRAWINGS 20 base
22A u-bolt
22B u-bolt
24A rectangular rubber washer
24B rectangular rubber washer
26A rectangular metal washer
26B rectangular metal washer
28A wing nut
28B wing nut
28C wing nut
28D wing nut
30 cantilever spring arm - form A
30A proximal lower member
30B intermediate member
30C distal upper member
30D fishing line retainer
31 tuning marks
32 distal upper member adjustment clamp
32A distal upper member adjustment clamp body
32B thumb set screw
32C thumb set screw
32D adjustable fishing line retainer - A
34 fishing line retainer adjustment clamp
34A fishing line retainer adjustment clamp body
34B thumb set screw
34C adjustable fishing line retainer - B
36 polyethylene motor housing mount
37A vinyl strap
37B vinyl strap
38 motor housing
40 motor on-off switch
42 battery operated motor
44 motor shaft
46 shaft eccentric fly weight
48 battery
50 weighted clip
52 fishing rod
52A fishing rod tip
54 fishing rod annular guides
56 monofilament fishing line
58 dummy motor housing
60 brass sleeve bushing
62 pin wheel fan
64 pin wheel fan shaft
64A threaded portion of shaft
66 nut
68 pin wheel fan center hole
70 nut
72 nut
74A pin wheel fan corner hole
74B pin wheel fan corner hole
74C pin wheel fan corner hole
74D pin wheel fan corner hole
76 metal washer
78 eccentric weight
80 nut
82A pin wheel fan vane
82B pin wheel fan vane
82C pin wheel fan vane
82C pin wheel fan vane
84 cantilever spring arm - form B
86 cantilever spring arm - form C
88 cantilever spring arm - form D
90 cantilever spring arm - form E
92 cantilever spring arm - form F
94 cantilever spring arm - form G
96 cantilever spring arm - form H
98 cantilever spring arm - form I
100 lure

DETAILED DESCRIPTION OF INVENTION DRAWINGS

FIGS. 1, 2A, 2B

The present invention is illustrated in an isometric view in FIG. 1. FIG. 2A and 2B are prior art from U.S. Pat. No. 5,208,987, May 11, 1993, Christen. They show a battery operated vibrating motor with eccentric in side and end views. A base 20 rests on the ice, dock, or boat seat (dock and boat seat not shown). Two u-bolts 22A and 22B, two rectangular rubber washers 24A and 24B, two rectangular metal washers 26A and 26B, and four wing nuts 28A, 28B, 28C and 28D are used to attach a cantilever spring arm form A 30 to base 20. Spring arm 30 is divided into the following four sectional components: a proximal lower member 30A, an intermediate member 30B, a distal upper member 30C, and a fishing line retainer 30D. Lower member 30A is attached to base 20. A motor housing 38 containing a battery operated motor 42 (FIG. 2A) is attached by a polyethylene motor housing mount 36 and two vinyl straps 37A and 37B to intermediate member 30B. In FIG. 2A motor housing 38 has a motor on-off switch 40. Motor 42 has a motor shaft 44 on to which a shaft eccentric fly weight 46 is mounted. A battery 48 is located in housing 38.

In FIG. 1 upper member 30C of spring arm 30 leads to line retainer 30D in which a monofilament fishing line 56 rests during operation of the device. Fishing line 56 comes from a fishing rod 52 with a fishing rod tip 52A. Fishing rod 52 has several fishing rod annular guides 54. Fishing line 56 has a lure 100 attached to it. An x, y, z, coordinate with rotation about the y-axis shows the multidimensional facets of motion of lure 100. Spring arm 30 is marked along it's entire length with numerous tuning marks 31 at regular intervals to designate a setting. An adjustable weighted clip 50 can be located anywhere on intermediate member 30B or upper member 30C.

FIGS. 3A, 3B, 3C

FIG. 3B shows a pin wheel fan 62 that can be used as a vibrational source instead of motor 42. The view shows pin wheel fan 62 as it faces the wind. Pin wheel is defined here as a small wheel with vanes pinned to a shaft as to revolve in the wind. The simplest wind fan is the pin wheel. A brass sleeve bushing 60 (FIG. 3C) is retained in a dummy motor housing 58 that fits in motor housing mount 36 (FIG. 1). Sleeve bushing 60 (FIG. 3C) is retained at a 15 degree angle above horizontal in dummy motor housing 58. Sleeve bushing 60 accepts a pin wheel shaft 64 that is smooth and not threaded. In FIG. 3C a threaded portion of pin wheel shaft 64A is used to mount the pin wheel fan 62.

FIG. 3A shows a flat pattern of pin wheel fan 62 with four pinwheel vanes 82A, 82B, 82C, 82D. Fan 62 is consistent with a simple pin wheel design. Fan 62 is a one piece construction consisting of a 9.2 cm square sheet of 0.2 mm thickness aluminum. From each corner a cut is made to within 10 mm of a pinwheel fan center hole 68. The sharp corners are gently rounded for safety. A fan corner hole 74A is united on threaded shaft 64A (FIG. 3C) with three other fan corner holes 74B, 74C, 74D to form four pin wheel vanes 82A, 82B, 82C, 82D, (FIG. 3B).

FIG. 3C is a side view with 2 vanes removed showing how fan 62 is mounted on shaft 64A. Center hole 68 is locked on shaft 64A between a nut 66 and a nut 70. A nut 72, a metal washer 76, and a nut 80 unite corner holes 74A, 74B, 74C, 74D. Corner holes 74B and 74C are not pictured due to two vanes being removed. Between nut 80 and washer 76, an eccentric weight 78 is interposed.

Figure 5:
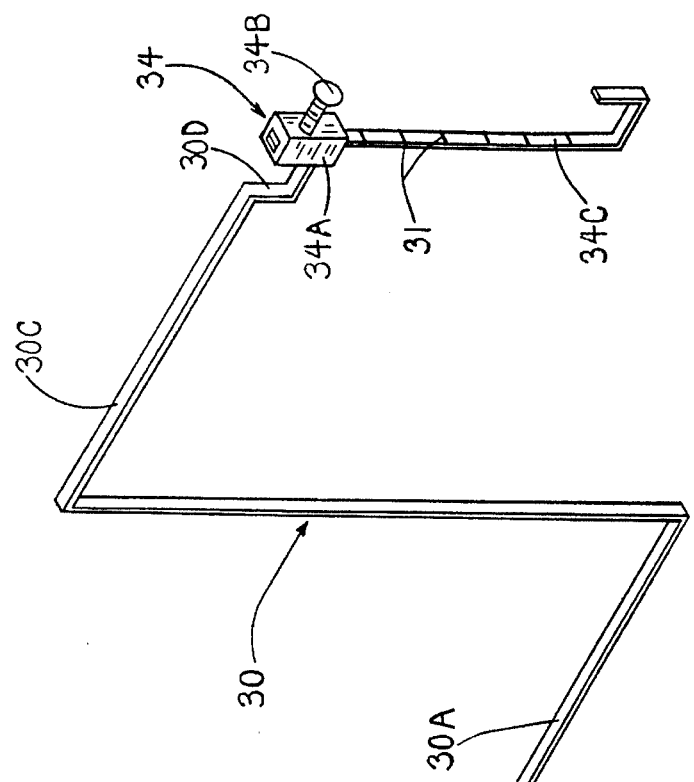
FIG. 5 shows fishing line retainer adjustment clamp.
Figure 4:
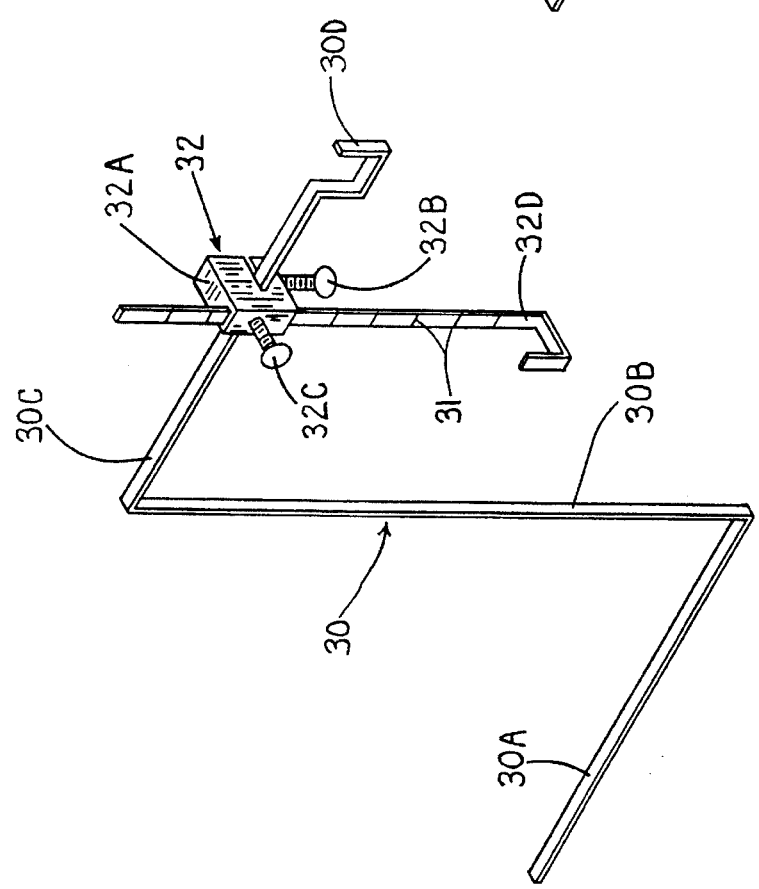
FIG. 4 shows distal upper member adjustment clamp.

FIGS. 4 and 5

FIG. 4 shows spring arm 30 with a distal upper member adjustment clamp 32. Clamp 32 has a distal upper member adjustment clamp body 32A and a thumb set screw 32B and a thumb set screw 32C and an adjustable fishing line retainer—A 32D marked with tuning marks 31.

FIG. 5 shows spring arm 30 with a fishing line retainer adjustment clamp 34. Clamp 34 has a fishing line retainer adjustment clamp body 34A with a thumb set screw 34B and an adjustable fishing line retainer—B 34C marked with tuning marks 31.

FIGS. 6, 7, 8, 9, 10, 11, 12, 13

Figure 6:
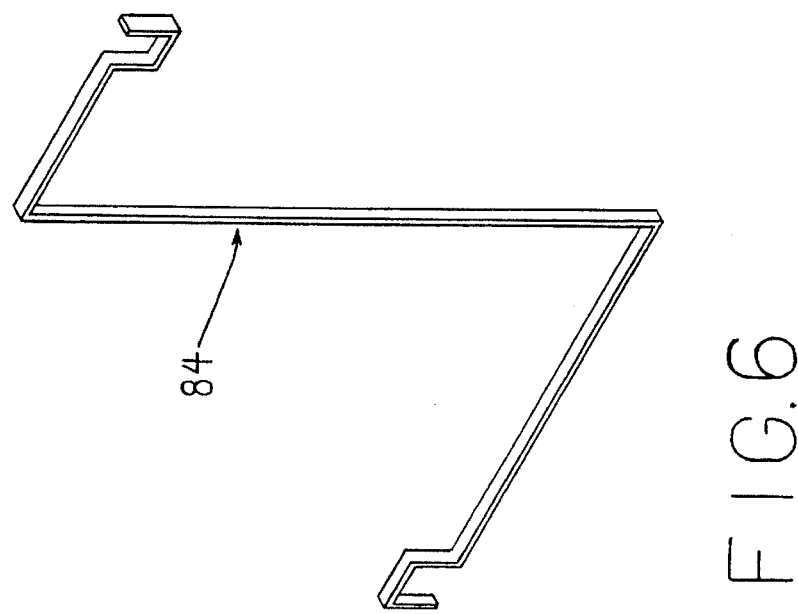
FIG. 6 shows cantilever spring arm form B.

FIG. 6 shows an interchangeable alternative of a cantilever spring arm form B 84. Spring arm 84 features the distal upper member that is short or long depending on how it is mounted to base 20.

Figure 7:
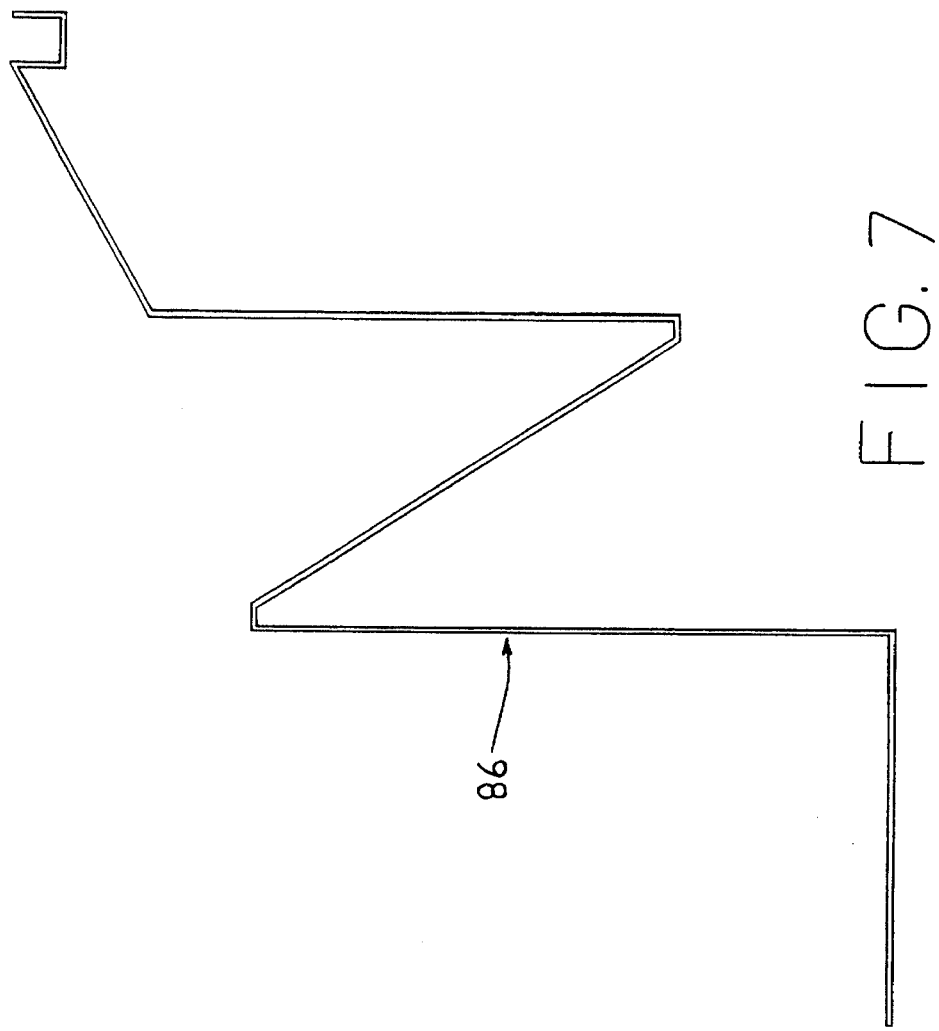
FIG. 7 shows cantilever spring arm form C in side view.

FIG. 7 shows an interchangeable alternative of a cantilever spring arm form C 86.

Figure 8:
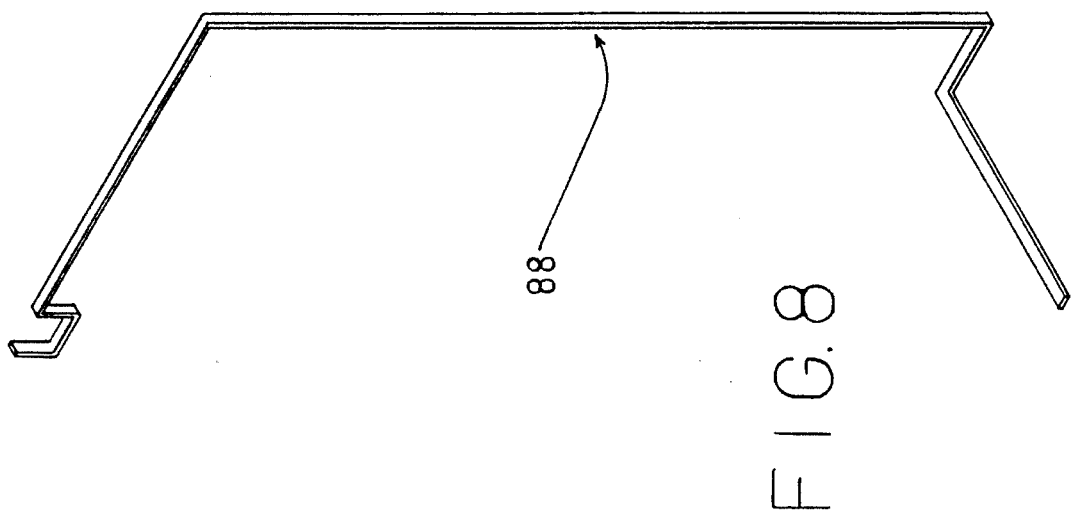
FIG. 8 shows cantilever spring arm form D.

FIG. 8 shows an interchangeable alternative of a cantilever spring arm form D 88.

Figure 9:
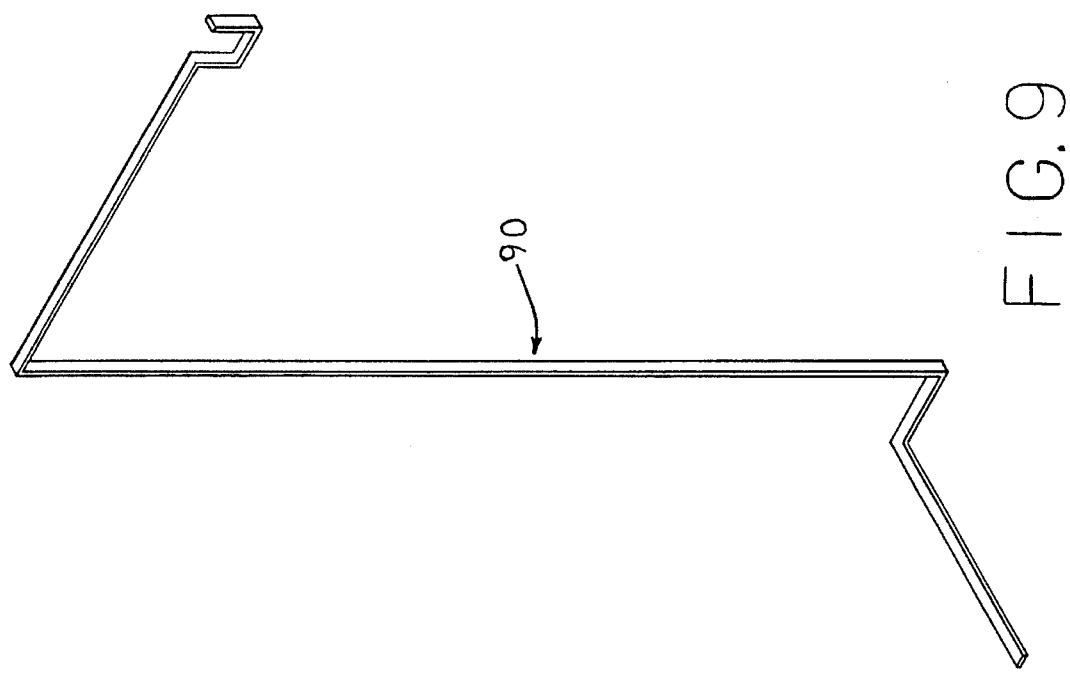
FIG. 9 shows cantilever spring arm form E.

FIG. 9 shows an interchangeable alternative of a cantilever spring arm form E 90

Figure 10:
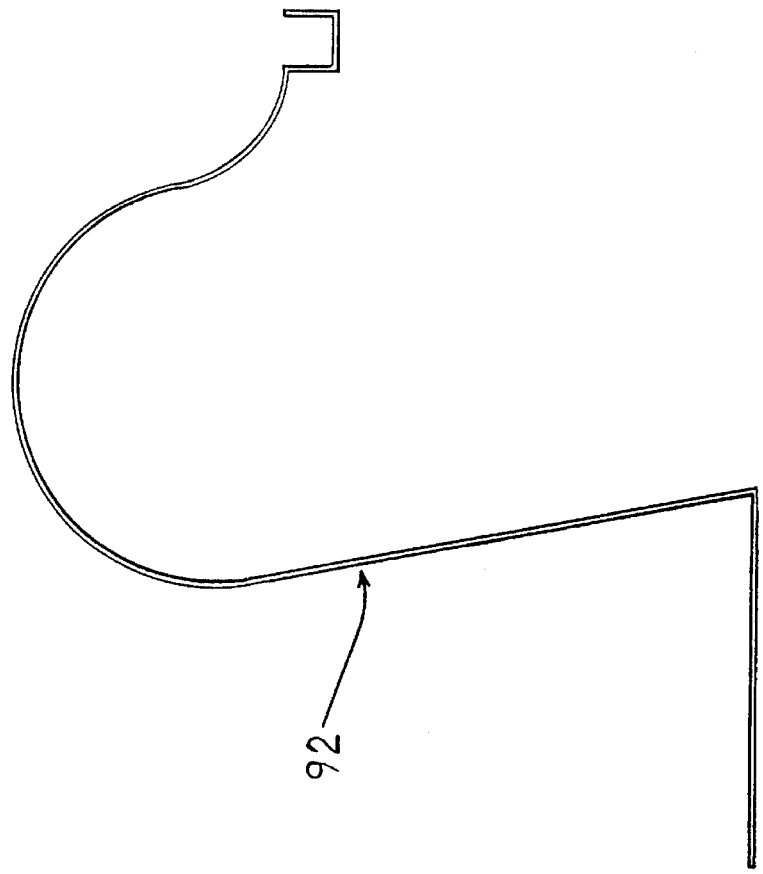
FIG. 10 shows cantilever spring arm form F in side view.

FIG. 10 shows an interchangeable alternative cantilever spring arm form F 92.

Figure 11:
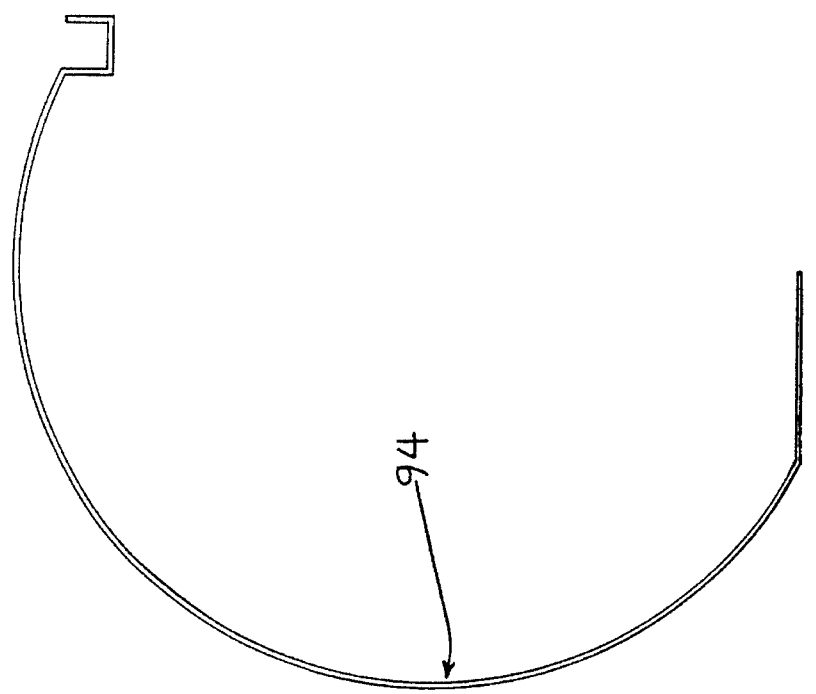
FIG. 11 shows cantilever spring arm form G in side view.

FIG. 11 shows an interchangeable alternative cantilever spring arm form G 94.

Figure 12:
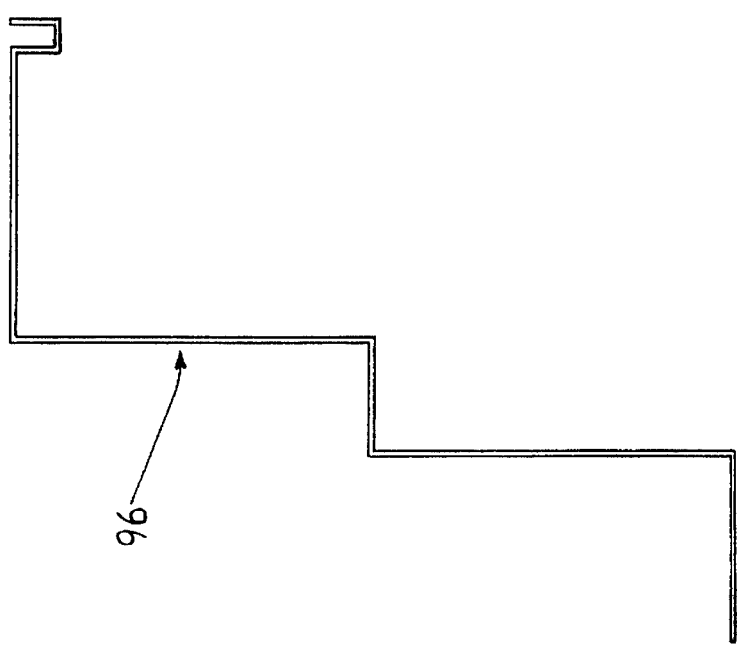
FIG. 12 shows cantilever spring arm form H in side view.

FIG. 12 shows an interchangeable alternative cantilever spring arm form H 96.

Figure 13:
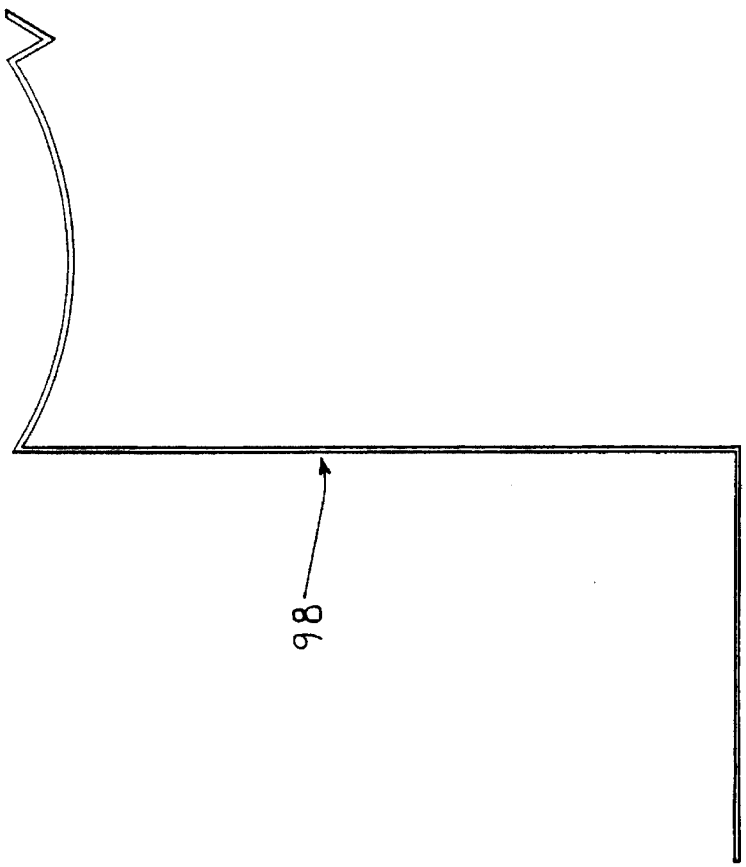
FIG. 13 shows cantilever spring arm form I in side view.

FIG. 13 shows an interchangeable alternative cantilever spring arm form I 98.

The cross-sectional size of cantilever spring arm 30 and alternative forms is of two different sizes. Cross-sectional shape of spring arm 30 and alternative spring arm forms 84, 86, 88, 90, 92, 94, 96, 98, is rectangular and measures 6.0 mm×1.70 mm or 4.6 mm×1.7 mm. Spring arm 30 and alternative spring arm forms 84, 86, 88, 90, 92, 94, 96, 98, are spring steel and resilient enough to hold their form and exhibit spring-like properties under operation.

OPERATION OF INVENTION FIGS. 1–13

The present invention provides mechanical jigging motion to lure 100 or bait. Base 20 of the device serves as a counter weight to prevent tipping. Base 20 is a solid foundation from which motion travels along cantilever spring arm 30 towards line retainer 30D. A plurality of different sized and formed spring arms 30, 84, 86, 88, 90, 92, 94, 96, 98 interchangeably attach and adjust to base 20. By sliding lower member 30A between rubber washers 24A, 24B, and base 20, and securing metal washers 26A, 26B with wing nuts 28A, 28B, 28C, 28D, adjustments are made. Attached to intermediate member 30B is motor housing mount 36 by two vinyl straps 37A and 37B and is position adjustable at tuning marks 31 by moving on intermediate member 30B. Motor housing 38 containing motor 42 is retained in motor housing mount 36. Motor 42 is equipped with shaft eccentric fly weight 46 to produce a vibrating movement. This movement transfers to spring arm 30. The vibrating motion causes line retainer 30D to vibrate with a certain frequency and fishing line 56 that is lying in line retainer 30D transfers motion to lure 100 and to fishing rod tip 52A which is vibrating as well. Vibration of rod tip 52A and line retainer 30D influence how lure 100 performs or presents itself.

Motor housing mount 36 is adjustable by moving on intermediate member 30B. Spring arm 30 is marked at regular intervals with tuning marks 31 throughout it's length to designate settings. Weighted clip 50 is placed at positions on intermediate member 30B and upper member 30C as an adjustment to the type of vibration wanted.

Variables Involved in Operation

The motion of lure 100 is complex and determined by several variables. A multitude of predator fish attracting motions are available. The range of motion goes beyond the up and down movement. It is multidimensional movement. In FIG. 1 the x, y, z, coordinate with rotation about the y-axis illustrates the multidimensional movement that can occur in lure 100. The variables determining the type and degree of motion are the following: a) battery 48 strength, b) motor housing 38 position on spring arm 30, c) lower member 30A setting on base 20, d) weight of lure 100, e) type of lure 100, f) use of clip 50 positioned at different points on spring arm 30, g) flexibility of fishing rod tip 52A, h) cross-sectional size and form of spring arm 30 and alternative forms, 84, 86, 88, 90, 92, 94, 96, and 98, i) monofilament fishing line 56 test or weight, j) use of distal upper member adjustment clamp 32 or fishing line retainer adjustment clamp 34, k) depth of lure 100 or distance from line retainer 30D.

Tuning the Device

The variables are significant in the adjustment or tuning process. To tune the device lure 100 is lowered into the water as far as possible but still visible. Motor on-off switch 40 is placed in the on position. Initial adjustments in motor housing 38 positions on intermediate member 30B are made to see when line retainer 30D produces a desired deflection and frequency. The lure 100 is observed to see what motion is produced. Motor housing 38 position is adjusted until the desired action of lure 100 is obtained. The degree of motion that is needed to entice the predator fish to attack lure 100 is determined by skill, knowledge, and ability to manipulate the variables.

Once the predator fish strikes lure 100, fishing line 56 is lifted off the line retainer 30D. The device allows the fishing rod 52 and reel to be used as they were designed. The fish is played and landed independent of the device.

Use of Pin Wheel Fan 62 as Vibrational Source

Motor housing 38 is replaced by dummy motor housing 58 containing pin wheel fan 62 if sufficient wind power is present. Dummy motor housing 58 is placed into housing mount 36 and the device is positioned so the wind rotates pin wheel fan 62. Operation and tuning of the device are the same as when motor 42 is used.

FIGS. 4 and 5 - Use of Adjustment Clamps

Distal upper member adjustment clamp 32 is shown in FIG. 4. Adjustable fishing line retainer - A 32D is raised or lowered by use of thumb set screw 32C Clamp 32 is moved along upper member 30C by use of thumb set screw 32B. This changes the form and action of spring arm 30.

FIG. 5 shows fishing line retainer adjustment clamp 34. Clamp 34 is clamped on line retainer 30D. Thumb set screw 34B raises or lowers adjustable fishing line retainer—B 34C. This changes the form and action of spring arm 30.

FIGS. 6, 7, 8, 9, 10, 11, 12, 13

FIG. 6 shows an interchangeable alternative of cantilever spring arm form B 84. Depending on which end is attached to base 20, makes spring arm form B 84 two different forms contained in one form, simply by flip-flopping.

FIGS. 7, 8, 9, 10, 11, 12, 13 show interchangeable alternative spring arms 86, 88, 90, 92, 94, 96, 98, respectively. The alternative forms work in a similar manner as spring arm 30, but with variations in the motion produced in lure 100. Clamp 32 and clamp 34 can be used on the alternative forms to further alter them.

Resulting Motion In Lure 100

Due to the many variables, the resultant motion of lure 100 caused by the device is multidimensional. Motions observed can be described as swimming, dancing, jumping, bucking, trembling, quivering, cyclic, wobbling, pulsating, irregular jumping, 360 degree movement in a cylinder, twisting, swimming in a circle, to and fro, vibrating, wiggling, life-like, whipping, zigging and zagging, fluttering, bouncing, erratically facing one direction then another, and head waving side to side.

CONCLUSION, RAMIFICATIONS, AND SCOPE

Accordingly, the reader will see that the jigging device of this invention can be manufactured economically due to it's simple component parts. It can be tuned easily and thus can appeal to a wide variety of ages. The device can operate by battery operated motor or wind driven fan. It can provide a jigging device that is a separate entity from the fishing rod. Thus, the rod can be used as designed. It allows the fisherman to play his catch on a well balanced flexible rod. The fishing rod can be used without being damaged or broken or misbalanced by not attaching the device to the rod. The jigging device, by being separate from the fishing rod and reel, can allow greater variability in tuning the motion of the lure. By lifting the monofilament line off the device, the line can be removed from the device. The device can be used without line tangling being a problem, due to the line's easy separation from the device. The device can be used to produce predator fish attracting motion in a lure by motion that is multidimensional The life-like motion is unable to be duplicated manually. The device can be disassembled and carried easily due to simple design.

Although the description above contains many specifications, these should not be construed as limiting the scope of the invention, but merely providing illustrations of some of the presently preferred embodiments of this invention. For example the spring arm can have many forms. This coupled with variance in the cross-sectional dimensions and shape of the spring arm, can provide a multitude of possible variables in itself. The cross-sectional shape of the spring arm could be round or oval. The fan used to provide vibration could be mounted vertically rather than 15 degrees above the horizontal, if a different type of fan is used, rather than a pin wheel design.

Thus the scope of the invention should be determined by the appended claims and their legal equivalents, rather than by the examples given.

Having thus described the invention, I claim:

1. A mechanical device for jigging a fishing lure automatically, that comprises:

(a) a base of predetermined size and weight so that said device will not tip over;

(b) a cantilever spring arm comprising a plurality of bends and curves;

(c) said cantilever spring arm further comprises:

(i) a proximal lower member that is substantially horizontal and connected to said base;

(ii) an intermediate member that is substantially vertical and continuous with said proximal lower member;

(iii) a distal upper member that is substantially horizontal and continuous with said intermediate member;

(iv) a fishing line retainer that is the terminal end of said cantilever spring arm and continuous with said distal upper member;

(d) a vibrational means for said cantilever spring arm, wherein said vibrational means comprises:
(i) a motor;
(ii) a motor shaft extending from said motor;
(iii) a shaft eccentric fly weight mounted on said motor shaft so that said motor vibrates;

(e) an attachment means of said vibrational means to said cantilever spring arm so that motion is transferred to said cantilever spring arm.

2. The device as set forth in claim 1 wherein said attachment means of said vibrational means has an adjustment means for different positions on said cantilever spring arm.

3. The device as set forth in claim 1 wherein a distal upper member adjustable clamp can be clamped to said distal upper member so that said fishing line retainer can be moved horizontally and vertically along said distal upper member to make the position of said fishing line retainer variable.

4. The device as set forth in claim 1 wherein there is an adjustment means on said base for positioning said proximal lower member so that the length of said proximal lower member is variable.

5. The device as set forth in claim 1 wherein a fishing line retainer clamp can be attached to said fishing line retainer so that said fishing line retainer is variable in the vertical direction.

6. The device as set forth in claim 1 wherein a weighted clip can be placed on said cantilever spring arm so that motion in said cantilever spring arm is variable.

7. The device as set forth in claim 1 wherein there is a means for changing the position of said fishing line retainer in relation to said base.

8. The device as set forth in claim 1 whereby said motor vibrates said cantilever spring arm away from said base towards said fishing line retainer, to automatically jig a fishing lure.

9. A mechanical device for jigging a fishing lure automatically, that comprises:

(a) a base of predetermined size and weight so that said device will not tip over;

(b) a cantilever spring arm comprising a plurality of bends and curves;

(c) said cantilever spring arm further comprises:
(i) a proximal lower member that is substantially horizontal and connected to said base;
(ii) an intermediate member that is substantially vertical and continuous with said proximal lower member;
(iii) a distal upper member that is substantially horizontal and continuous with said intermediate member;
(iv) a fishing line retainer that is the terminal end of said cantilever spring arm and continuous with said distal upper member;

(d) a vibrational means for vibrating said cantilever spring arm, wherein said vibrational means comprises:
(i) a pin wheel fan with a plurality of vanes that rotates by the wind;
(ii) a pin wheel shaft connected to said pin wheel fan, so that said pin wheel shaft rotates;
(iii) an eccentric weight mounted on said pin wheel shaft so that vibration is produced;
(iv) a sleeve bushing that holds said pin wheel shaft so that it spins freely in the wind;
(v) a dummy motor housing that holds said sleeve bushing in a fixed position;

(e) an attachment means for said vibration means to said cantilever spring arm so that motion will be transferred to said cantilever spring arm.

10. The device as set forth in claim 9 wherein there there is an adjustment means for said attachment means for said vibrational means so that said vibrational means can be variably positioned on said cantilever spring arm.

11. The device as set forth in claim 9 whereby said pin wheel fan with said eccentric weight vibrates said cantilever spring arm away from said base towards said fishing line retainer, to automatically jig a fishing lure.

12. The device as set forth in claim 9 wherein a distal upper member adjustable clamp can be clamped to said distal upper member so that said fishing line retainer can be moved horizontally and vertically along said distal upper member to make the position of said fishing line retainer variable.

13. The device as set forth in claim 9 wherein there is an adjustment means on said base for positioning said proximal lower member so that the length of said proximal lower member is variable.

14. The device as set forth in claim 9 wherein a fishing line retainer clamp can be attached to said fishing line retainer so that said fishing line retainer is variable in the vertical direction.

15. The device as set forth in claim 9 wherein a weighted clip can be placed on said cantilever spring arm so that motion in said cantilever spring arm is variable.

16. The device as set forth in claim 9 wherein there is a means for changing the position of said fishing line retainer in relation to said base.

* * * * *